United States Patent [19]

Yoshida

[11] Patent Number: 5,029,212
[45] Date of Patent: Jul. 2, 1991

[54] CONTINUOUS SPEECH RECOGNITION UNIT USING FORWARD PROBABILITIES

[75] Inventor: Kazunaga Yoshida, Tokyo, Japan
[73] Assignee: NEC Corporation, Tokyo, Japan
[21] Appl. No.: 416,560
[22] Filed: Oct. 3, 1989
[30] Foreign Application Priority Data
  Oct. 3, 1988 [JP] Japan .................. 63-250555
[51] Int. Cl.$^5$ .............................. G10L 7/08
[52] U.S. Cl. ...................................... 381/43
[58] Field of Search ..................... 381/41–47; 364/513.5

[56] References Cited

U.S. PATENT DOCUMENTS

| | | | |
|---|---|---|---|
| 4,748,670 | 5/1988 | Bahl et al. | 381/43 |
| 4,783,804 | 11/1988 | Juang et al. | 381/43 |
| 4,831,550 | 5/1989 | Katz | 381/43 |
| 4,852,180 | 7/1989 | Levinson | 381/43 |
| 4,881,266 | 11/1989 | Nitta et al. | 381/43 |

*Primary Examiner*—Dale M. Shaw
*Assistant Examiner*—John A. Merecki
*Attorney, Agent, or Firm*—Sughrue, Mion, Zinn, Macpeak & Seas

[57] ABSTRACT

A continuous speech recognition unit using forward probabilities for recognizing continuous speech associated with standard patterns for given units of recognition comprises a standard template memory for storing Markov model standard templates of standard speech, which are composed of state sequences and transition probabilities between the states; an observation probability computing device for computing a forward probability for a feature vector time sequence; and a cumulative value computing device for determining a cumulative value based on the sum of previous cumulative values. The unit further comprises a matching pass memory for storing maximum values produced by the cumulative value computing means and a result processor for determining recognition results indicative of recognized words. The unit stores the transition giving the best probability in memory for each state and traces back the recognition result for the word sequence based on the transitions in memory.

8 Claims, 3 Drawing Sheets

CONTINUOUS SPEECH RECOGNITION UNIT USING FORWARD PROBABILITIES

BACKGROUND OF THE INVENTION

The present invention relates to the improvement of a continuous speech recognition unit for recognizing continuous speech composed of continuously uttered words.

Conventionally, a known speech recognition method, is a speech recognition method by "Hidden Markov Model" (hereinafter referred to as HMM) a described in Stephen E. Levinson, "Structural Methods in Automatic Speech Recognition", Proceedings of the IEEE, Vol. 73, No. 11, November 1985" (hereinafter referred to as "literature 1") page 1633. In this method, first the generation phase of speech patterns is modelled as the state transition model by the Markov process. This state transition model is HMM. Speech recognition of the observed speech patterns is performed by determining observation probabilities from this HMM.

Let us consider the case where words are recognized by using this process. In this case, first, a HMM is formed for each word to be recognized. This method for forming HMM is fully described in the above-mentioned "literature 138 , page 1633. When a speech pattern is inputted to the speech recognition result unit, the observation probability for each HMM is computed, and a recognition result is obtained as a word for the HMM which gives the highest observation probability. This observation probabilities can be also considered as the similarity between the speech pattern and each HMM, in which HMM is equivalent to the standard pattern. The observation probabilities for HMM can be obtained by the forward algorithm or the Baum algorithm as described in the above-mentioned "literature 1", page 1634.

Further the HMM allows continuous speech patterns composed of continuously uttered word to be recognized. As an example of continuous speech recognition, the case where units of recognition are words is explained. However, any recognition such as vocal sound can be similarly treated. The continuous speech recognition in the case where units of recognition are words can be achieved by means of the Viterbi algorithm as described in the above-mentioned "literature 1", page 1635.

The Viterbi algorithm used for continuous speech recognition is an approximation method in which the observation probabilities of words can be obtained from the product of probabilities on a matching pass which is defined as a trace associated with the correspondence between points in time of two patterns. Therefore, the Viterbi algorithm has a disadvantage that the recognition rate thereof is generally low compared with the forward algorithm in which the observation probabilities for words can be obtained from probabilities on all possible matching passes.

On the other hand, in the forward algorithm, the matching pass giving the maximum probability cannot be uniquely determined. Therefore, the forward algorithm has a disadvantage that a recognition result cannot be obtained unless computations are performed for all combinations of word sequences in a round robin manner when performing continuous speech recognition.

SUMMARY OF INVENTION

An object of the present invention is to provide a continuous speech recognition unit wherein the efficient continuous speech recognition can be implemented by a small number of computations so that the matching pass giving the maximum probability can be obtained for a word based on the forward algorithm with high recognition performance.

The object of the present invention is achieved by continuous speech recognition unit for recognizing continuous speech associated with the standard patterns of the given units of recognition comprising: a standard pattern memory means for storing observation probabilities and transition probabilities as a standard pattern; a similarity computing the means for computing similarity between speech patterns inputted to the continuous speech recognition unit and the standard pattern based on the correspondence between respective points in time; a cumulative value computing means for computing, as a cumulative value, the product of the sum of the cumulative values of the similarities obtained for all or part of matching passes on the speech pattern up to a certain point in time; a cumulative value memory means for storing the cumulative values; a matching pass memory means for storing the matching pass which maximizes the cumulative value; and a result processor means for determining a recognition result which corresponds to the most probable state from the stored cumulative value and the matching pass.

In the continuous speech recognition unit according to the present invention, the cumulative value computing means is a computer which computes the product of the sum of the cumulative values of the similarities obtained for matching passes on the speech pattern up to a certain point in time, or the product of the sum of the cumulative values of the similarities obtained for matching passes stored in the matching pass memory, wherein positions of start points for units of recognition obtained from the matching passes are coincident with positions of start points for the matching passes which give the maximum similarities, or the product of the sum of the cumulative values of the similarities obtained for matching passes, wherein all or part of recognition results estimated by the result processor means are coincident with the recognition result for the matching passes which give the maximum similarities.

The operation of the continuous speech recognition unit according to the present invention will now be explained.

In the present invention using continuous word recognition executed with Hidden Markov models described in the above-mentioned literature 1, the calculation of probabilities between words is made based on the Viterbi algorithm. Namely, it is assumed that the recognition result for a word sequence up to a certain point in time t on speech patterns gives the maximum probability at that point in time. It is further assumed that the calculation of probabilities in words is made by means of the forward algorithm and that the matching pass is obtained.

In the present invention, observation probabilities are computed by obtaining a forward likelihood which is the cumulative value of the probabilities by means of the forward algorithm. Matching pass is obtained by way of preserving the matching pass which gives the maximum forward likelihood at a point in time, by which it becomes possible that observation probabilities are obtained by means of the forward algorithm and matching pass is obtained. Next, this method is explained.

Observed speech patterns are expressed in $\{O_t | 1 < t < T\}$ as a time series of characteristic vectors thereof. If the probability that speech pattern $O_t$ is observed is represented by observation distribution $b_j(O_t)$ and the transition probability that a state changes from i to j is represented by $a_{ij}$, the forward likelihood $\alpha(j,t)$ at the point in time t and in state j can be computed by means of the forward algorithm from the following formula:

$$\alpha(j,t) = \sum_{1 \leq i \leq J} \alpha(i,t-1) \cdot a_{ij} \cdot b_j(O_t) \quad (1)$$

Further, to obtain the recognition result for a word, position of start point of the word is traced back together with the recognition result of the time of the terminal point thereof, and stored. In frames of respective points in time t, the time before one frame of the start point of the word w giving the best result of recognition can be obtained by using the following back pointer $l(j,t)$. Namely, assuming that in a state of start 1 in HMM of word $l(1,t)=t-1$ the forward partial likelihood in a word is computed from the formula (1). Therefore, the position of the start point with respect to the matching pass giving the maximum probability is propagated according to the following formula:

$$e(j,t) = e(\text{argmax}(\alpha(i,t-1) \cdot a_{ij}), t-1) \quad (2)$$
$$1 \leq i \leq J$$

wherein $$\text{argmax}(x(i))$$
$$i$$

represents i giving the maximum of $x(i)$.

For a time s before one frame of start point of a word is preserved in the back pointer $l(J,t)$ obtained at terminal state J of the word. The name of the work w, corresponding to the maximum value of forward likelihood $l(J, t)$ and time s before one frame of start point of its word, are preserved in the resulting word memory $Rw(t)=w$ and the resulting start point memory $Rs(t)=s$.

When the recognition process has been completed up to terminal point T for a speech pattern inputted to the continuous speech recognition unit, the recognition result for the word sequence can be obtained by following up in order positions of start points of preserved words. Namely, it can be obtained in the following steps of:
(1) setting t=T;
(2) outputting the result of recognition $w=Rw(t)$, and setting $t=Rs(t)$; and
(3) terminating the process in case of t<1, and, except for this case, returning to (2).

Outputted recognition results which are arranged in reverse order, correspond to the recognition result of the word sequence.

If the contribution of the matching pass giving the maximum probability to forward likelihood is large, it is possible to obtain results of recognition with high precision in the above mentioned method. However in case of obtaining forward likelihood from the formula (1), there is the possibility that traced-back start point of word differs. When start point of word differs, there is also the possibility that the recognition results of the word sequence for the start point differs. In this case, for calculation of the formula (1), forward probabilities for various word sequences are unfavorably summed.

Further, in the present invention, the forward probability is computed by adding only forward likelihoods for matching passes, wherein a start point is coincident with a start point of the matching pass giving the maximum forward probability at its point in time. Namely the computation of the forward probability according to the formula (1) is transformed as follows.

$$i_{max} = \text{argmax}(\alpha(i,t-1) \cdot a_{ij}) \quad (3)$$
$$1 \leq i \leq J$$

$$\alpha(j,t) = \Sigma \alpha(i,t-1) \cdot a_{ij} \cdot b_j(O_t) \quad (4)$$
$$(1 \leq i \leq J) \& (e(i,t-1) = e(i_{max},t-1))$$

In the computation, the summation of only forward likelihoods which satisfy $l(i,t-1)=l(i_{max},t-1)$ is performed. Therefore the increase of processing amount is small. The back pointer l can be computed from the formula (2).

Accordingly, there is cancelled a problem that the forward likelihoods for different recognition results are unfavorably added, since the recognition result is uniquely determined for a start point. However with regard to the matching pass when a start point differs to some extent, there is the possibility that an error will result, since the forward likelihood for the matching pass is not added.

Further in the present invention, the forward likelihood is computed by adding forward likelihoods for matching pass whose recognition result matches the recognition result of the matching pass giving the maximum probability up to a certain point in time, including the forward likelihood for the matching pass having a different position of the start point. Since there is high possibility that the matching pass having the forward likelihood close to the maximum likelihood yields the same recognition result, in spite of different position of start point thereof, this method is effective.

To implement this method, recognition results up to a certain point in time are propagated as in the back pointer obtained from the formula (2). Namely, result pointer $r(j,t)$ is produced. It is assumed that at a start point for HMM of a word (state 1), $$r(1,t)=c \quad (5)$$

where c represents a coded sequence of words which were recognized before that point in time.

In other words, result pointer is computed as follows:

$$i_{max} = \text{argmax}(\alpha(i,t-1) \cdot a_{ij}) \quad (6)$$
$$1 \leq i \leq J$$

$$r(j,t) = r(i_{max},t-1) \quad (7)$$

The forward likelihood is computed from the following formula.

$$a(j,t) = \Sigma a(i,t-1) \cdot a_{ij} \cdot b_j(O_t) \quad (8)$$
$$(1 \leq i \leq J) \ \& \ (r(i,t-1) = r(i_{max},t-1))$$

Therefore, since the forward likelihood is obtained by adding forward likelihoods which have same recognition results, the forward likelihood can be obtained with high precision.

The sequence of words recognized before that point in time is kept as a code c at the result pointer $r(j,t)$. As with the number of words which have been recognized, code c becomes larger, therefore there is the possibility that the processing amount for comparison computation is increased. To deal with this problem, only a few recent recognition results, which have been recognized are coded instead of coding all of recognition results, which have been recognized, by which code c can be made to an appropriate value.

According to the present invention it is possible to implement a continuous speech pattern recognition unit in which continuous speech pattern recognition can be performed with high precision a small number of computations.

PREFERRED EMBODIMENT OF THE INVENTION

One embodiment of a continuous speech recognition unit according to the present invention is explained with reference to the drawings.

Figure 1:
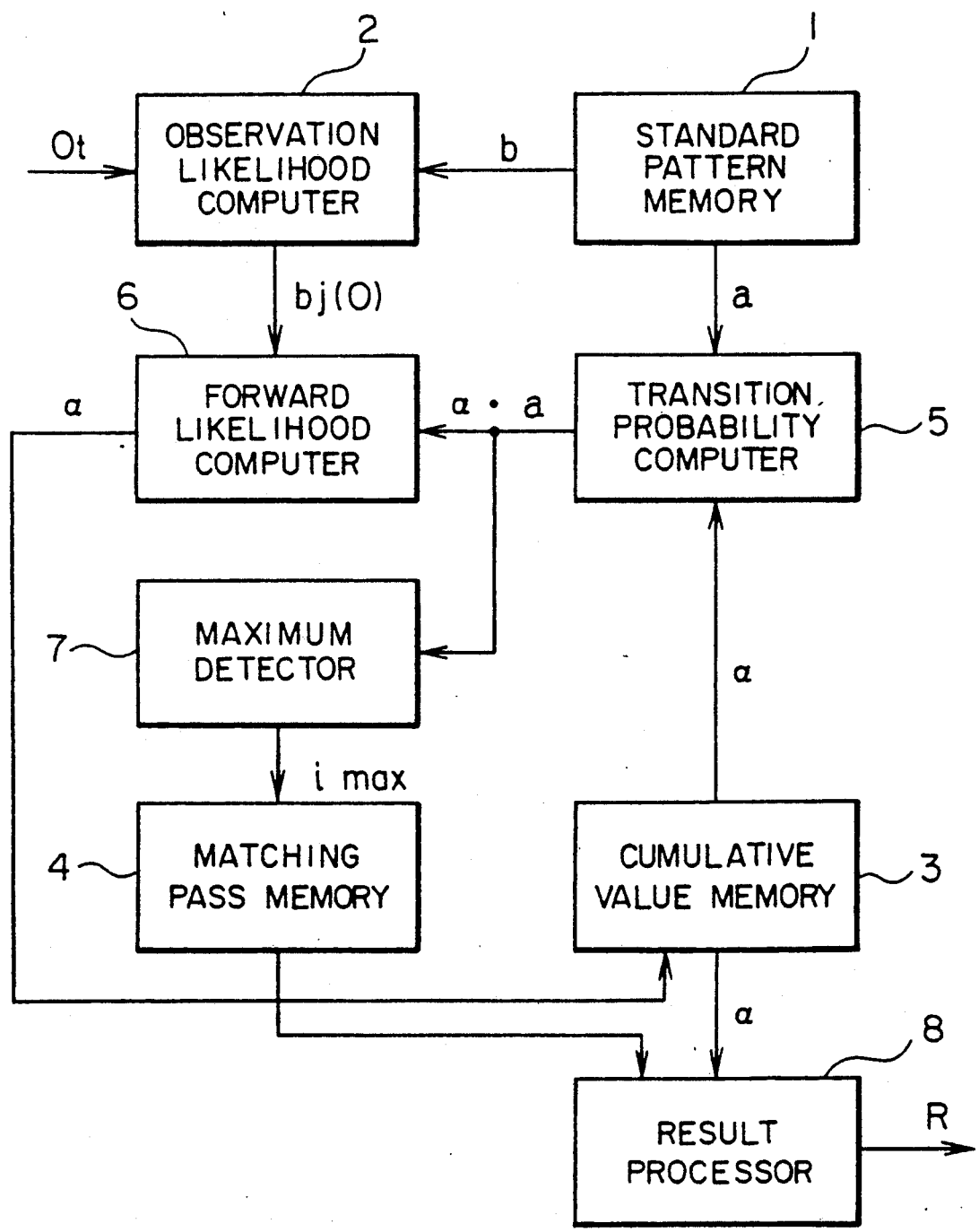
FIG. 1 is a schematic diagram showing a first embodiment according to the present invention.

FIG. 1 is a schematic diagram showing the first embodiment according to the present invention. The continuous speech recognition unit of the first embodiment according to the present invention comprises a standard pattern memory 1, an observation likelihood computer 2, a transition probability computer 5, a forward likelihood computer 6, a maximum detector 7, a matching pass memory 4, a cumulative value memory 3 and a result processor 8.

The standard pattern memory 1 is connected to the observation likelihood computer 2 and the transition probability computer 5. The observation likelihood computer is connected to the forward likelihood computer 6. The transition probability computer 5 is connected to the forward likelihood computer 6 and the maximum detector 7. The forward likelihood computer 6 is connected to the cumulative value memory 3, which is connected to the transition probability computer 5 and the result processor 8. The maximum detector 7 is connected to the matching pass memory 4, which is in turn connected to the result processor 8. Standard patterns of word units are kept, as observation likelihood table $b_j(O)$ and transition probability $a_{ij}$ which are parameters of HMM as shown in the expression (1), in the standard pattern memory 1. Speech pattern $O_t$ is inputted to the observation likelihood computer 2. At the observation likelihood computer 2, observation likelihood $b_j(O_t)$ of the speech pattern $O_t$ is computed by using the observation likelihood table $b_j(O)$. The observation likelihood is obtained by vector quantization as described in the above-mentioned literature 1, page 1634.

Forward likelihoods $\alpha(j,t)$ are kept in the cumulative value memory 3. For an initial value, $\alpha(1,1)=1.0$ while for the other j,t,α is 0.0. Further the back pointer $l(j,t)$ representing the position of the start point with respect to a matching pass is kept in the matching pass memory 4. For an initial value, the value of $l(1, t)=t-1$ is set at $j=1$ for the state corresponding to the start point of the word.

When the observation likelihood $b_j(O_t)$ for time t is computed at the observation likelihood computer 2, the transition probability $a_{ij}$ is read out from the standard pattern memory 1, and successively the forward likelihood $\alpha(j,t-1)$ is read out from the cumulative value memory 3. Product $\alpha(i,t-1) \cdot a_{ij}$ is computed at the transition probability computer 5. Said value is inputted from the transition probability computer 5 to the forward likelihood computer 6 while the observation likelihood $b_j(O_t)$ is inputted from said value and the observation likelihood $b_j(O_t)$, the forward likelihood $\alpha(j,t)$ is computed according to the formula (1). The obtained forward likelihood $\alpha(j,t)$ is kept at the cumulative value memory 3.

Therewith, the product $\alpha(i,t-1) \cdot a_{ij}$ is inputted from the transition probability computer 5 to the maximum detector 7, and $i_{max}$ which is i giving the maximum of obtained forward likelihoods at its point in time is computed according to the formula (3) at the maximum detector 7. The back pointer $l(j,t)$ is computed from the $i_{max}$ read out from the maximum detector 7 according to the formula (2) at the matching pass memory 4 and kept therein.

When the above-mentioned process has been completed for time t, the forward likelihoods $\alpha(J,t)$ and the back pointer $l(J,t)$ for a final state are read out from the cumulative value memory 3 and the matching pass memory 4, respectively, and the best recognition result is determined according to the method described in the above-mentioned literature 1 at the result processor 8 and kept therein. When the above-mentioned process has been completed, the recognition result of word sequence R can be obtained by following up positions of the start points for the words which are kept in the above-mentioned method.

A second embodiment of the present invention will now be explained.

Figure 2:
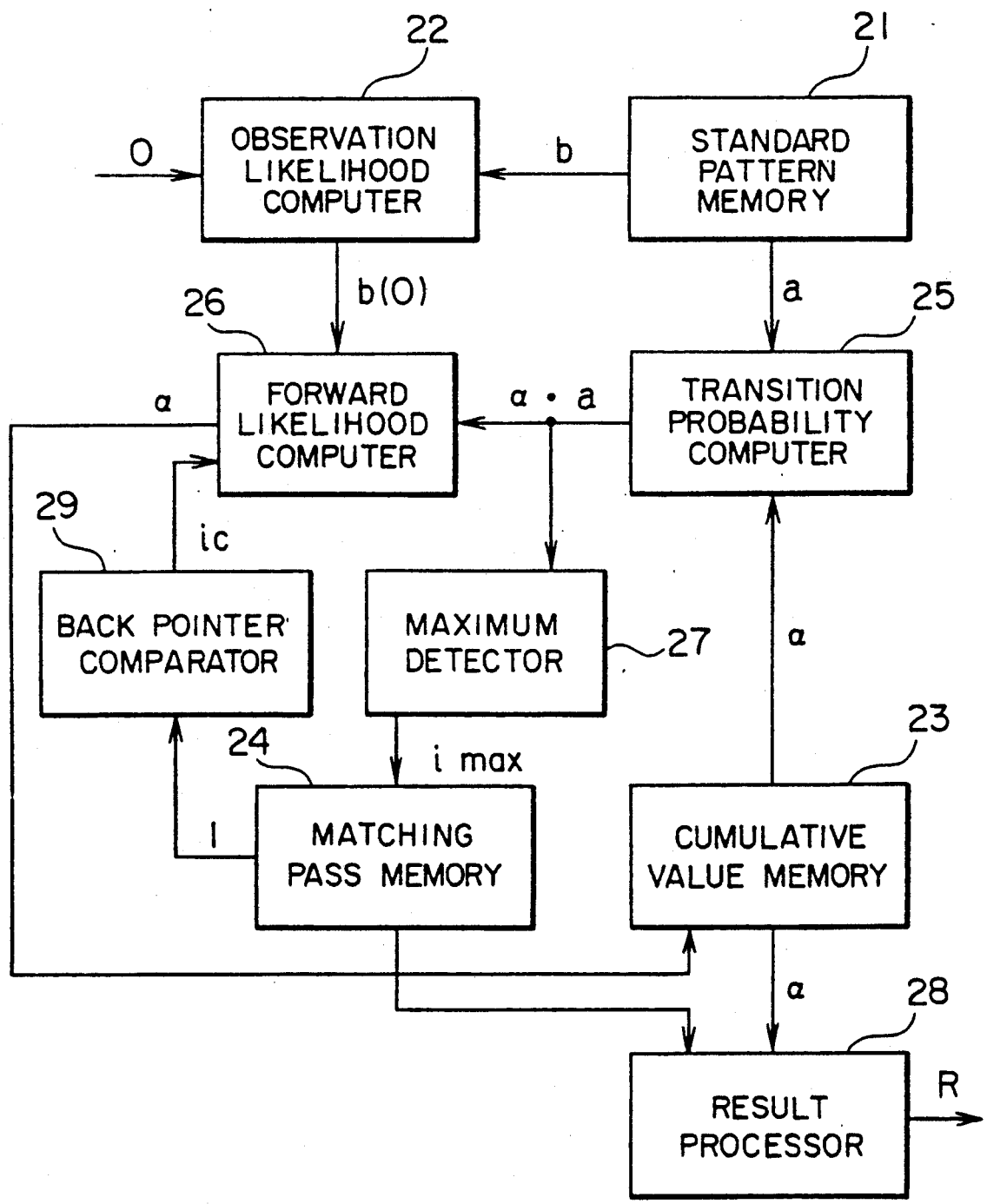
FIG. 2 is a schematic diagram showing a second embodiment according to the present invention.

FIG. 2 is a schematic diagram showing the second embodiment according to the present invention.

The continuous speech recognition unit of the second embodiment according to the present invention comprises a standard pattern memory 21, an observation likelihood computer 22, a transition probability computer 25, a forward likelihood computer 26, a maximum detector 27, a back pointer comparator 29, a matching pass memory 24, a cumulative value memory 23 and a result processor 28. The standard pattern memory 21 is connected to the observation likelihood computer 22 and the transition probability computer 25. The observation likelihood computer 22 is connected to the forward likelihood computer 26. The transition probability computer 25 is connected to the forward likelihood computer 26 and the maximum detector 27. The maximum detector 27 is connected to the matching pass memory 24, which is connected to the back pointer comparator 29 and the result processor 28. The forward likelihood computer 26 is connected to the cumulative value memory 23, which are connected to the transition probability computer 25 and the result processor 28.

As in the first embodiment, the forward likelihood $\alpha(j,t)$ is kept in the cumulative value memory 23. For the initial value, $\alpha(1,1)=1.0$ while for the other $j,t,\alpha$ is 0.0. Further the back pointer $l(j,t)$ representing the position of the start point with respect to a matching pass is kept in the matching pass memory 24. For an initial value, the value for $l(1,t)=t-1$ is set at $j=1$ of the state corresponding to the start point of the word.

When the observation likelihood $b_j(O_t)$ for time t is computed at the observation likelihood computer 22 the transition probability $a_{ij}$ is read out from the standard pattern memory 21 and successively the forward likelihood $\alpha(j,t-1)$ is read out from the cumulative value memory 23. Product $\alpha(i,t-1)\cdot a_{ij}$ is computed at the transition probability computer 25. The product is inputted from the transition probability computer 25 to the maximum detector 27, at which $i_{max}$ which is i giving the maximum of obtained forward likelihood at its point in time is computed according to the formula (3). The back pointer $l(j,t)$ is computed from the $i_{max}$ read out from the maximum detector 27 according to the formula (2) at the matching pass memory 24, and kept therein.

The back pointer $l(i,t-1)$ for state i successively read out from the matching pass memory 24 is compared with $l(i_{max},t-1)$ giving the maximum at the back pointer comparator 29, and state ic in which the former matches the latter is outputted from the back pointer comparator 29 to the forward likelihood computer 26. The forward likelihood $\alpha(j,t)$ is obtained as the product of sum of products $\alpha(i,t-1)\cdot a_{ij}$ accumulated with respect to the state ic and the observation likelihood $b_j(O_t)$ according to the formula (4), at the forward likelihood computer 26. The obtained forward likelihood $\alpha(j,t)$ is outputted from the forward likelihood computer 26 to the cumulative value memory 23 and kept therein.

As in the first embodiment, when the above-mentioned process for time t has been completed, the forward likelihood $\alpha(J,t)$ and the back pointer $l(J,t)$ for a final state are read out from the cumulative value memory 23 and the matching pass memory 24, respectively, and the best recognition result is determined at the result processor 28 and kept therein. When the above-mentioned process has been completed, the recognition result for word sequence R can be obtained by following up positions of the start points of the words, which are kept in the above-mentioned method.

A third embodiment of the present invention will now be explained.

Figure 3:
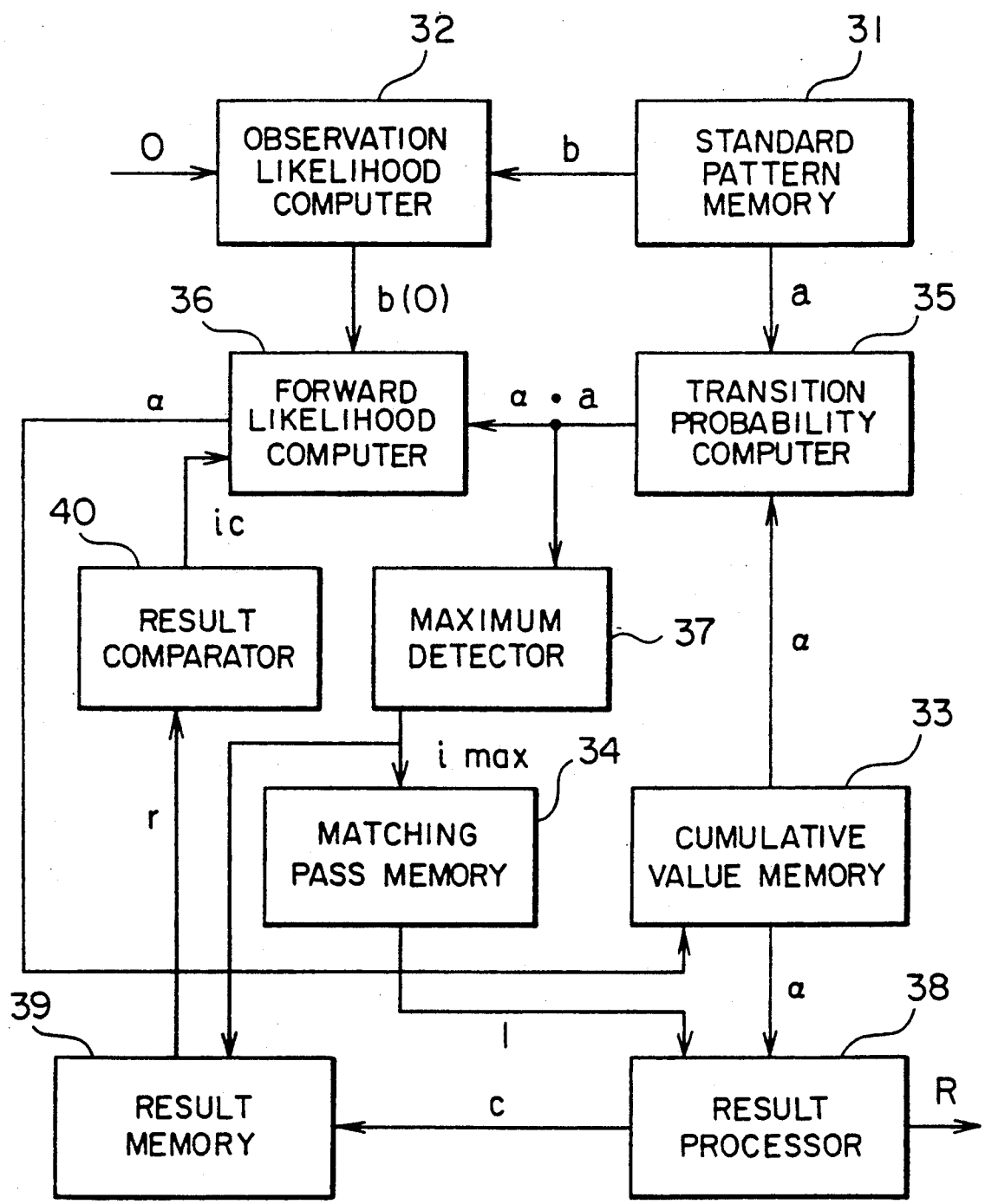
FIG. 3 is a schematic diagram showing a third embodiment according to the present invention.

FIG. 3 is a schematic diagram showing the third embodiment according to the present invention.

The continuous speech recognition unit of the third embodiment according to the present invention comprises a standard pattern memory 31, an observation likelihood computer 32, a transition probability computer 35, a forward likelihood computer 36, a maximum detector 37, a result comparator 40, a cumulative value memory 33, a matching pass memory 34, a result memory 39, and a result processor 38.

The standard pattern memory 31 is connected to the observation likelihood computer 32 and the transition probability computer 35. The transition probability computer 35 is connected to the forward likelihood computer 36 and the maximum detector 37. The observation likelihood computer 32 is connected to the forward likelihood computer 36. The maximum detector 37 is connected to the matching pass memory 34 and the result memory 39. The matching pass memory 34 is connected to the result processor 38. The result memory 39 is connected to the result comparator 40, which is connected to the forward likelihood computer 36. The forward likelihood computer 36 is connected to the cumulative value memory 33, which are connected to the transition probability computer 35 and the result processor 38.

As in the first embodiment, the forward likelihood $\alpha(j,t)$ is kept in the cumulative value memory 33. For an initial value, $\alpha(1,1)=1.0$ while for the other $j,t,\alpha$ is 0.0. Further the back pointer $l(j,t)$ representing the position of the start point with respect to a matching pass is kept in the matching pass memory 34. For an initial value, the value of $l(1,t)=t-1$ is set at $j=1$ of the state corresponding to the start point of the word.

Further, the result pointer $r(j,t)$ is kept in the result memory 39. For an initial value, a coded recognition result c is set.

When the observation likelihood $b_j(O_t)$ for time t is computed at the observation likelihood computer 32, the transition probability is read out from the standard pattern memory 31 and successively the forward likelihood $\alpha(j,t-1)$ is read out from the cumulative value memory 33. Product $\alpha(i,t-1)\cdot a_{ij}$ is computed at the transition probability computer 35. The product is inputted from the transition probability computer 35 to the forward likelihood computer 36 and the maximum detector 37. A value $i_{max}$ which is i producing the maximum forward likelihood is computed according to the formula (3), at the maximum detector 37. The back pointer $l(j,t)$ is computed from the $i_{max}$ read out from the maximum detector 37 according to the formula (2) at the matching pass memory 34 and kept therein. Similarly, the result pointer $r(j,t)$ is computed according to the formula (7) at the result memory 39 and kept therein.

The value $r(i,t-1)$ for state i successively read out from the result memory 39 is compared with the result pointer $r(i_{max},t-1)$ giving the maximum read out therefrom at the result comparator 40, and state ic in which the former matches the latter is outputted from the result comparator 40 to the forward likelihood computer 36, at which the forward likelihood $\alpha(j,t)$ is obtained as product of sum of products $\alpha(i,t-1)\cdot a_{ij}$ summed up with respect to the state ic and the observation likelihood $b_j(O_t)$ according to the formula (8) at the forward likelihood computer 36. The obtained forward likelihood $\alpha(j,t)$ is outputted from the forward likelihood computer 36 to the cumulative value memory 33 and kept therein.

As in the first embodiment, when the above mentioned process for time t has been completed, the forward likelihood $\alpha(J,t)$ and the back pointer $l(J,t)$ for a final state are read out from the cumulative value memory 33 and the matching pass memory 34, respectively, and the best recognition result is determined at the result processor 38 and kept therein. At the same time, the best recognition result is output as result c from the result processor 38 to the result memory 39. It is kept as the initial value of the result pointer $r(j,t)$ as shown in the formula at the result memory 39.

When the above-mentioned process has been completed, the result of recognition of word sequence R can be obtained by following up positions of the start points of the words, which are kept in the above-mentioned method.

What is claimed is:

1. A continuous speech recognition unit using forward probabilities, comprising:
   a standard pattern memory for storing a plurality of standard patterns, having a form of Markov model templates represented by an observation probability density function providing a plurality of states and a plurality of transition probabilities between said states, in a predetermined manner;
   probability computing means for determining an observation probability at each point in time for a feature vector time sequence input to said probability computing means by use of said observation probability density function;
   cumulative value computing means for computing a new cumulative value based on a product of said observation probability, at least one of said transition probabilities stored in said standard pattern memory and a sum of cumulative values for all transitions for each time of said feature vector time sequence;
   a matching pass memory for storing, for each of said states, transition information giving the maximum value of said product of said observation probability, said at least one transition probability and said cumulative value for all transitions in said states; and
   result processor means for determining the most probable ones of said states by back-tracing transition information for each of said states stored in said matching pass memory so as to obtain a plurality of recognition results.

2. Continuous speech recognition unit as claimed in claim 1, wherein said cumulative value computing means computes, as said cumulative value, a product of a sum of said cumulative values of said observation probabilities obtained for a plurality of matching passes wherein said recognition results are estimated by said result processor means are coincident with a plurality of recognition results for said matching passes which give a maximum observation probability.

3. Continuous speech recognition unit as claimed in claim 2, wherein said observation probability is forward likelihood.

4. Continuous speech recognition unit as claimed in claim 1, wherein said observation probability is forward likelihood.

5. The continuous speech recognition unit of claim 1, wherein said cumulative value computing means connects the standard patterns prepared for each of a plurality of recognition units, each of said recognition units representing a word, to one another according to a predetermined network, said cumulative value computing means further comprising:
   means for determining a plurality of input times corresponding to a plurality of starting points of said standard patterns of said recognition units from said transition information based on a product of said observation probability, said transition probability and said cumulative value determined for transitions of said feature vector up to one of said input times as a new cumulative value;
   means for determining, from said transitions, one of said transitions producing a maximum value of the products of said observation probability, said transition probability between said states and said cumulative value up to said time at which said sum is obtained, and the sum of said transitions coinciding in input times with one another, said input times corresponding to said starting point.

6. Continuous speech recognition unit as claimed in claim 5, wherein said observation probability is forward likelihood.

7. The continuous speech recognition unit of claim 1, wherein said cumulative value computing means connects said standard patterns prepared for each of a plurality of recognition units, such as word, to one another according to a predetermined network, said cumulative value computing means further comprising:
   means for determining the most likely of said recognition results when said new cumulative value is determined based on a product of said observation probability, said transition probability and previous ones of said cumulative values up to this time in said states for one feature vector; and
   means for determining one of said transitions producing a maximum value within said transitions of said products of said observation probability and said cumulative value up to said time at which the sum is obtained, in the states and sum of the transitions whose recognition results are at least partially coincident with each other up to this time.

8. Continuous speech recognition unit as claimed in claim 7, wherein said observation probability is forward likelihood.

* * * * *

UNITED STATES PATENT AND TRADEMARK OFFICE
CERTIFICATE OF CORRECTION

PATENT NO. : 5,029,212

DATED : July 2, 1991

INVENTOR(S) :

Page 1 of 2

It is certified that error appears in the above-identified patent and that said Letters Patent is hereby corrected as shown below:

```
Col. 1, line 27, delete "138", insert -- 1" --
Col. 3, line 23, delete the 1st occurrence of "1", insert
-- e --
Col. 3, line 24, delete the 1st occurrence of "1", insert
-- e --
Col. 3, line 40, delete "1" insert --e--.
Col. 3, line 43, delete "1" insert -- α --
Col. 4, line 23, delete "1(i,t-1) =1" insert --e(i,t-1) =e--.

Col. 4, line 25, delete "1", insert -- e --
Col. 6, line 5, delete "1", insert -- e --
Col. 6, line 8, delete the 1st occurrence of "1", insert
-- e --
Col. 6, line 30, delete "1", insert -- e --
Col. 6, line 36, delete "1", insert -- e --
Col. 7, line 6, delete "1", insert -- e --
Col. 7, line 9, delete "1", insert -- e --
Col. 7, line 22, delete "1", insert -- e --
Col. 7, line 26, delete "1", insert -- e --
Col. 7, line 28, delete "1", insert -- e --
Col. 7, line 41, delete "1", insert -- e --
Col. 8, line 13, delete "1", insert -- e --
Col. 8, line 16, delete "1", insert -- e --
```

UNITED STATES PATENT AND TRADEMARK OFFICE
CERTIFICATE OF CORRECTION

PATENT NO. : 5,029,212

DATED : July 2, 1991

INVENTOR(S) : Kazunage Yoshida

Page 2 of 2

It is certified that error appears in the above-identified patent and that said Letters Patent is hereby corrected as shown below:

Col. 8, line 33, delete '1", insert --e--.

Col. 8, line 55, delete "1", insert --e--.

Signed and Sealed this

Ninth Day of March, 1993

*Attest:*

STEPHEN G. KUNIN

*Attesting Officer*     *Acting Commissioner of Patents and Trademarks*